US006760038B2

(12) United States Patent
Venkataraman et al.

(10) Patent No.: US 6,760,038 B2
(45) Date of Patent: Jul. 6, 2004

(54) METHOD FOR RECOGNIZING BLENDS IN SOLID MODELS

(75) Inventors: Sashikumar Venkataraman, Mumbai (IN); Milind A. Sohoni, Mumbai (IN)

(73) Assignee: Geometric Software Solutions Co. Limited, Mumbai (IN)

(*) Notice: Subject to any disclaimer, the term of this patent is extended or adjusted under 35 U.S.C. 154(b) by 220 days.

(21) Appl. No.: 09/984,801

(22) Filed: Oct. 31, 2001

(65) Prior Publication Data

US 2002/0180729 A1 Dec. 5, 2002

Related U.S. Application Data

(60) Provisional application No. 60/294,212, filed on May 31, 2001.

(51) Int. Cl.[7] .............................................. G06T 15/00
(52) U.S. Cl. ..................................................... 345/620
(58) Field of Search ................................ 345/419, 420, 345/619, 629, 630, 440

(56) References Cited

U.S. PATENT DOCUMENTS 5,615,317 A * 3/1997 Freitag ........................ 345/419
6,133,922 A * 10/2000 Opitz ........................... 345/420

OTHER PUBLICATIONS

Ji et al.; "Machine Interpretation of CAD Data for Manufacturing Applications"; ACM Computing Surveys, vol. 24, No. 3, Sep. 1997, pp 264–311.

* cited by examiner

*Primary Examiner*—Phu K. Nguyen
(74) *Attorney, Agent, or Firm*—Stites & Harbison, PLLC; Ross F. Hunt, Jr.

(57) ABSTRACT

A method for building a database of at least one blend face in a solid model of a part comprising: generating a list of faces and edges comprising the solid model, analyzing at least one of the edges to determine that it is a smooth edge, analyzing the determined smooth edge to determine that it is a spring edge, analyzing the determined spring edge to identify a blend face that is adjacent to the spring edge. The method further includes identifying all blend faces on the part, forming chains of these blend faces and providing a listing of the chains in the order in which they were formed on the part.

13 Claims, 6 Drawing Sheets

METHOD FOR RECOGNIZING BLENDS IN SOLID MODELS

The present application claims priority of U.S. provisional application Serial No. 60/294,212 filed May 31, 2001, which is incorporated herein by reference. The present application further incorporates by reference the subject matter of U.S. application Ser. No. 09/397,104, filed Sep. 16, 1999, which application is owned by the same entity as the present application.

FIELD OF INVENTION

The invention relates generally to recognizing features in three-dimensional solid models and more particularly to a system and method for recognizing blends in a solid model of a part.

BACKGROUND OF THE INVENTION

Solid Modeling

Solid modeling is a term that refers to a set of techniques that can be used to create and store computer based representations of physical objects. A number of techniques have evolved over the years for providing computer-based representations of three-dimensional parts. One of these techniques is Boundary Representation, commonly referred to as B-rep.

A B-rep model of a mechanical part consists of a set of "faces," "edges" and "vertices," which are connected together to form a topological structure of the part. By using such a representation, it is possible to evaluate many properties of the part from its computer model. These include the mass, the volume, the moments of inertia and products of inertia. Additionally, such models enable computer-based analysis of stress and strains in the part under different loading conditions. B-rep based computer models can also be "cut" and examined in a manner similar to an actual part. For these reasons, a B-rep model of a part is known as a "solid" model.

Software based on solid modeling is widely used by engineers to create models of parts that are intended to eventually be manufactured. Software such as SolidWorks™ (SolidWorks Inc.), Pro/Engineer™ (Parametric Technology), I-DEAS™ (Structural Dynamics Research Corp.), Mechanical Desktop™ (AutoDesk) are examples of solid modeling software.

Feature recognition is the art of evaluating a B-rep (or other type) model of a part that is missing information regarding certain features of the model, recognizing those features and creating a database of those recognized features. A feature recognition system is used in these situations to aid in finding the design intent of the model from the B-Rep information and blend recognition is one of the important steps in the process of feature recognition.

The purpose of feature recognition is to recognize various features in a B-Rep model that typically does not have explicit feature information. The feature information may either be absent initially itself or may be lost due to translation of data from one CAD system to another. U.S. patent application Ser. No. 09/676,471, filed Oct. 2, 2000, discloses methods for recognizing another type of feature in B-rep solid models: holes, specifically, sets of complex, interacting holes. U.S. application Ser. No. 09/676,471 was commonly owned with the present invention at the time that the present invention was made.

Figure 1:
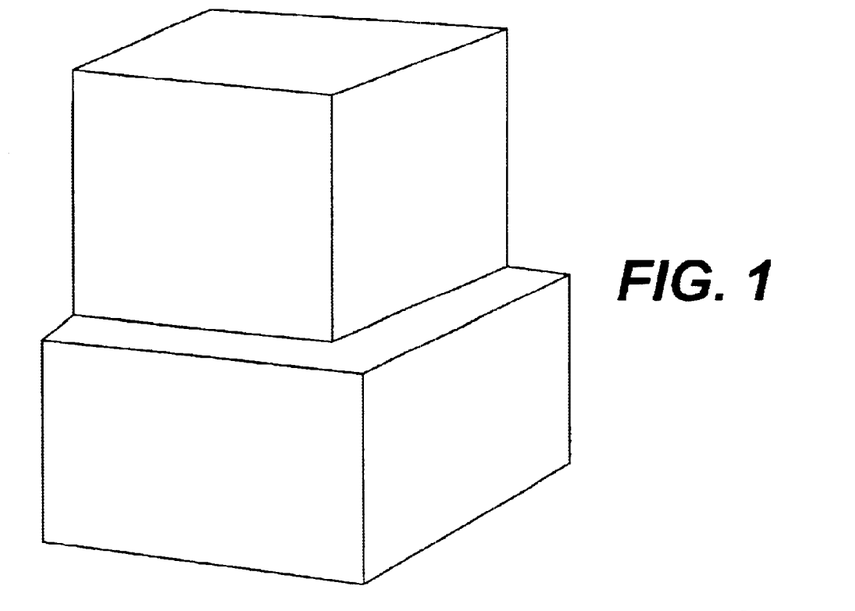
FIG. 1 is an isometric view of a solid model of a first part having no filets or blend faces.
Figure 2:
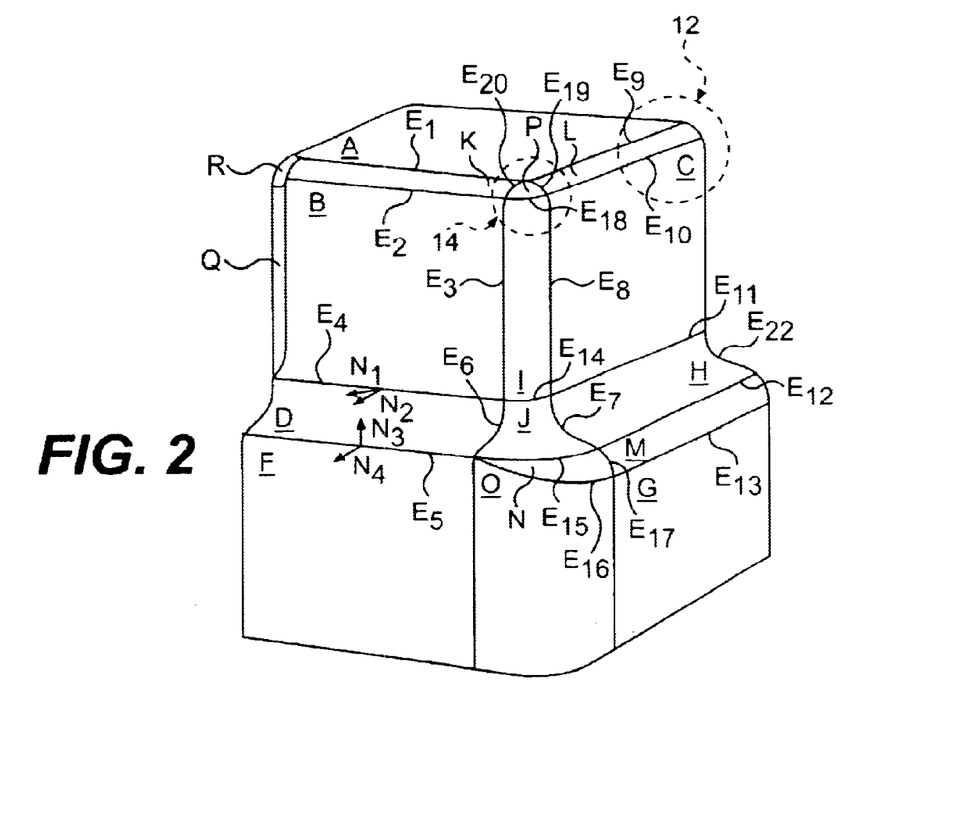
FIG. 2 is an isometric view of the solid model part in FIG. 1 wherein a number of the sharp edges and vertices have been smoothed by adding blend faces

Certain solid models also have blends as part of their design. Blends are mainly used to smoothen sharp edges and vertices of a part in order to improve their strength, the aesthetics, and to ensure the manufacturability of the part. FIG. 2 shows an example of blending the part shown in FIG. 1. Blend recognition can be used to detect all the blend features in the model along with the blend parameters. Blend recognition can also be used to detect the blend sequence that describes the order in which the blend features were created in a model.

One application of blend recognition is to aid in blend suppression or blend deletion. The blend recognition method disclosed herein detects the sequence in which blend chains were created in the model. The reverse of this sequence can be used to delete the blends in the model. Blend deletion helps in simplifying the part for downstream applications. Blend deletion also facilitates recognition of other volumetric features such as pockets/slots in the model. Deletion of the blend chains results in a model with sharp edge and vertices. FIG. 1 shows the solid model that is obtained after suppressing the blends in the solid model shown in FIG. 2.

Blend recognition can also be used to extract important parameters for manufacturing applications. For example, the blend parameters can provide information that will aid in selection of tools during machining.

Another application of blend recognition and suppression is for clean up operations in Finite Element Analysis (FEA). For example, it is often necessary to suppress blends that are less than a specific radius to simplify the model for further analysis. This facility for selective blend suppression can be implemented by utilizing the blend sequence generated by the blend recognizer of the present invention.

The present invention provides methods for automatic detection of blends in the model, for deducing the sequence in which the blends were created in the model and, these can eventually be used, if desirable, for deleting a set of recognized blends from the model.

Overview of Blends

Blends are typically introduced in solid modeling to smoothen sharp edges and vertices in the part. In this operation, called blending or filleting, new faces are introduced in place of the sharp edges to create smooth transitions from one surface to another. When creating solid model representations of parts, designers use various techniques provided by CAD systems to model fillets and blends.

Blends are of interest to engineers during all stages of the design-to-manufacturing cycle. While editing a part model, designers may be interested in modifying blend parameters such as the radius of the blend. In the analysis stage, an engineer may prefer to ignore some blends since they are not expected to contribute significantly to stresses and strains in the part. During manufacturing planning, the blend radii govern the selection of some of the manufacturing processes, the machine tools, the cutting tools and even the part stock itself.

The most common blend is the so-called face—face blend, which replaces a sharp edge by a face tangent to the two faces adjoining the sharp edge. The blend surface usually has a circular cross section, and the plane of the cross section is always perpendicular to both the faces. When three or more blended edges meet at a common vertex, a vertex blend is formed that connects all the neighboring blends smoothly. In simple blending, the geometry of a vertex blend is usually a sphere; however, in the general case, the geometry is described by an n-sided vertex blend surface.

In special cases, blending can also take place between a face and an edge. Such blends are called face-edge blends or cliff blends, and may occur as boundary cases of face-face blends. FIG. 2 shows an example that contains a few kinds of blend surfaces created while blending the simple part shown in FIG. 1. Blend K is a face-face blend on the top block of the part that essentially rounds the edge between the top face A and the face B. Blend P is a vertex blend that is made at one corner of the top block of the part and blend D is a face-edge blend between face B and edge E5.

In many situations, blends created in different blending operations interact with each other forming a blend network. The knowledge of the blend sequence is essential to understand the design intent of the model. This sequence also aids in post-recognition operations such as blend suppression. Frequently in real parts, a number of blends interact with each other to form a complex blend network. A blend network formed in multiple blending operations is shown in the solid model in FIG. 2.

SUMMARY OF THE INVENTION

The invention is a method implemented by a computer program, and a computer running the same, for recognizing complex blends in solid B-Rep models. In addition to recognizing individual blend faces, the method according to the invention can also group the set of blends created as a single feature (a chain), detect the sequence in which the blend chains got created. This sequence can be used to delete some or all of the blends—if required.

The invention comprises several software modules that, in a preferred embodiment, operate on B-rep solid models. The modules may be implemented in any computer programming language, such as C or C++, and may use local operators from known geometric modeling kernels.

The blend recognition method receives a boundary representation from, for example, one of the solid modeling programs mentioned above or from any other source capable of providing a standardized data structure for describing solids. The method identifies all blend faces and provides a sequence of blend chains in the solid model along with the corresponding blend parameters. Each blend chain consists of blend faces that could have been created in the same blending operation. The chains are sequenced in an order that denotes a sequence that could have been used to create the blend network.

In the model in FIG. 2, there are four blend chains. The sequence of the chains shows the order in which the blends were created in the original model. The four chains are as follows:

Chain 1—Blend Faces: K, P, L, I
Chain 2—Blend Face: O
Chain 3—Blend Faces: D, J, H
Chain 4—Blend Faces: M, N Blending Terminology The blend geometry is computed using an imaginary rolling ball that maintains contact with the surfaces to be blended. The blend surface can be visualized as the envelope of this ball as it rolls along the edge. Blending may either add material to or remove material from a model, depending on the convexity characteristics of the blended edge. A blend on a convex edge removes material from the model, while a blend on a concave edge adds material to the model. The locus of points traced by the rolling ball center is called the spine curve; the two edges of contact are called spring edges. The side faces of the blend are called the support faces since they support the rolling ball.

Often during blending, a single blend operation generates many blend faces connected smoothly to each other. Such sets of blend faces created in a single blending operation are referred to as chains. The edges that connect adjacent faces in a blend chain are called cross edges. Cross edges are usually generated when any of the adjoining support faces of the blend changes during blending. In FIG. 2, edge $E_9$ is a spring edge between faces A and L, and edge $E_{19}$ is a cross edge between blend faces L and P (P is a special type of blend face called a vertex face, as will be discussed later). Cross edge $E_{20}$ is part of a blend chain including faces K and P.

The blend curvature at a point on the blend surface is the curvature along the cross-section of the blend surface at that point. This is constant for constant radius blends and is equal to the principal curvature along that direction. The principal direction corresponding to the blend curvature at each point is termed as the blend direction. The commonly used face-face blends have constant cross-sectional radius throughout the blend surface. These are referred to as constant radius blends. Many modeling systems also support variable radius blends that have varying cross-sectional radii. Such blends usually arise during drafting blended models. An example of a variable radius blend is shown as face N in FIG. 2.

DETAILED DESCRIPTION OF THE PREFERRED EMBODIMENTS

Blend Recognition

This section describes the method for recognition of individual blend faces and creating chains of these blend faces. The basic steps of the method are outlined in the flowchart of FIG. 8 and each of these steps represents a set of processes that are described in more detail below. The method begins with step 10 and in step 20, the faces of the part are obtained from the B-rep model. Step 30 begins a routine wherein each face of the part is analyzed to determine whether or not it is a blend face.

Figure 8:
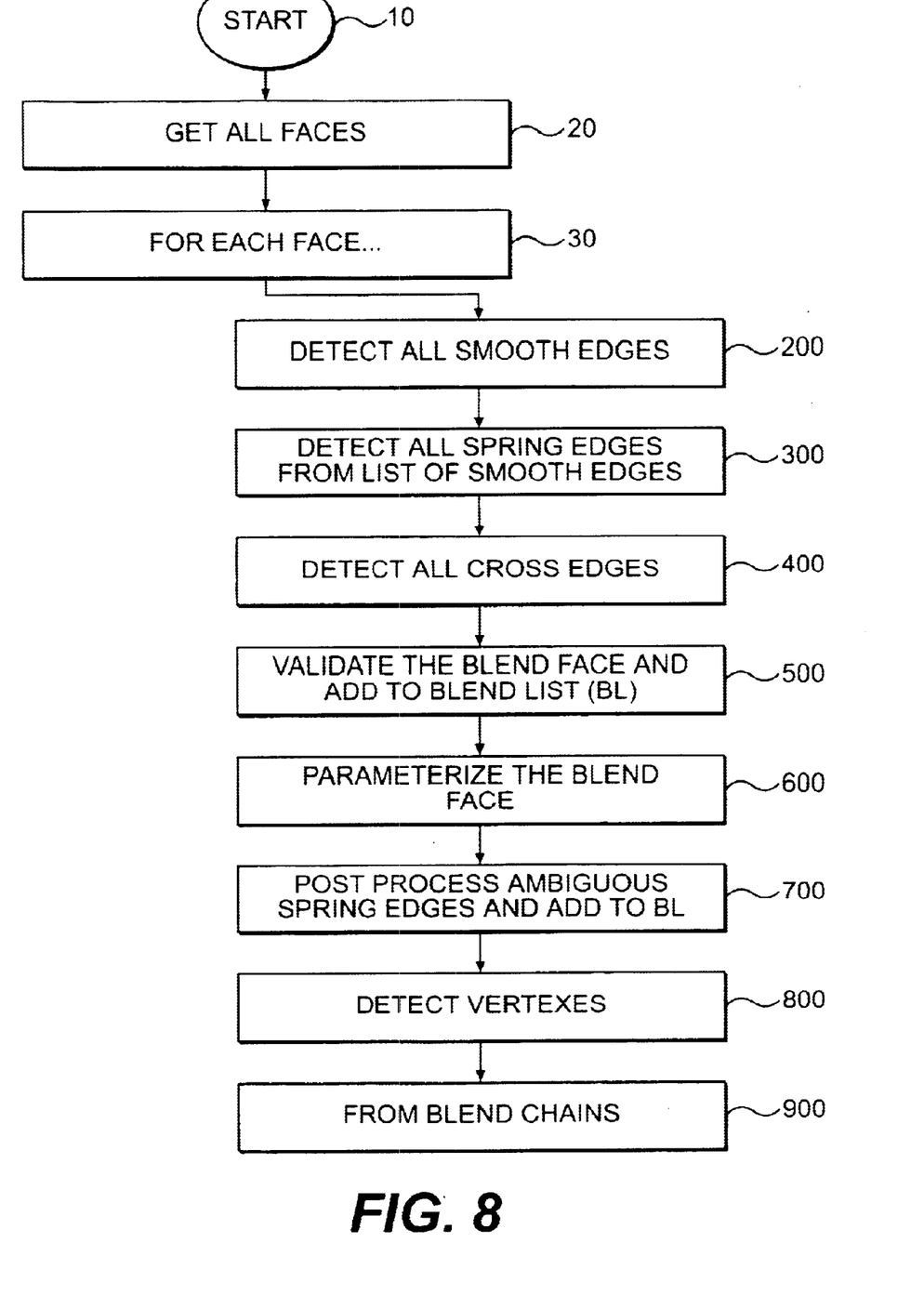
FIG. 8 is a flowchart illustrating one embodiment of the overall method of the invention.

In step 200, the face is analyzed to detect all smooth edges of the face. In step 300, the method determines whether any of these smooth edges are spring edges, indicating that the face may be a blend face. In step 400, any cross edges of the face are detected. A suspected blend face is validated in step 500 and, if validated, the blend face is parameterized in step 600 and added to the Blend List (BL). Parameterization is essentially building a group of attributes that are associated with the blend face. These attributes include information on adjacent faces as well. Ambiguous spring edges are processed in step 700, adding any additional blend faces to the BL. Vertexes are detected in step 800 and, after all blend faces are detected and parameterized, blend chains are formed in step 900. The preferred method is described in more detail below.

Smooth Edge Detection

A smooth edge is formed when two faces meet with tangent continuity along an edge. Edges that are not smooth are termed sharp edges. In FIG. 2, the part is labeled to show a smooth edge $E_4$ between faces B and D and sharp edge $E_5$ between faces D and F.

The classification of smooth edge is performed by evaluating the surface normals on the two faces at the mid-point of the edge. If the surface normals are along substantially the same direction, then the edge is classified as smooth, else it is classified as a sharp edge. In FIG. 2, surface normals $N_1$ and $N_2$ are drawn along edge $E_4$ with respect to faces B and D, respectively, and they are shown to be substantially along the same direction, thereby indicating that edge $E_4$ is a smooth edge between faces B and D (a smooth transition between the faces). Surface normals $N_3$ and $N_4$ drawn along edge $E_5$ are substantially perpendicular, thereby indicating that edge $E_5$ is a sharp edge between face D and F. Spring and cross edges generated during blending are both smooth edges. In general, the directions of the surface normals are determined with the magnitude of the cross product of the normals (e.g., $N_1 \times N_2$) and, if this magnitude is less than some user-defined threshold (tolerance), then the edge is marked as a smooth edge. If the magnitude is above the threshold, then the edge is considered a sharp edge. A new edge is then chosen for processing.

Spring Edge Detection

In this process, each smooth edge of the face is further analyzed to determine if it is a spring edge for the face under consideration. This analysis is performed using surface curvatures evaluated along the edges.

This process is divided into two analyses. In the first analysis (comprising Spring tests 1 and 2), the edge is checked to see if it is a potential spring edge for each of the adjoining faces of the edge, with a particular adjoining face as a potential blend face. If the edge is considered a potential spring edge based on the results of these two tests (the first analysis), in the second analysis, the edge is subjected to Spring test 3 to determine the face for which it is a spring edge. The spring edge and its associated face are then marked as such.

Notations

In order to discuss the methods and processes herein, it is important to first understand the notations used with respect to the curvatures of a face along an edge of that face. The notations used for these curvatures are listed below, with reference to FIG. 3a, which shows an enlarged portion of the solid model shown in FIG. 2, as designated by the breakout circle 12. In a preferred embodiment, the curvatures are tested only at the mid-point of the edge for speed efficiency. Alternatively, more points may be used for making the method more robust, for example, in the presence of noise in the incoming data.

Figure 3A:
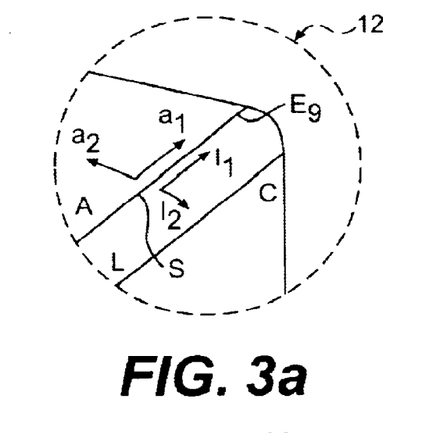
FIG. 3a is an enlarged view of the section of the part in FIG. 2 bounded by circle 12, labeled to show curvatures.
Figure 3B:
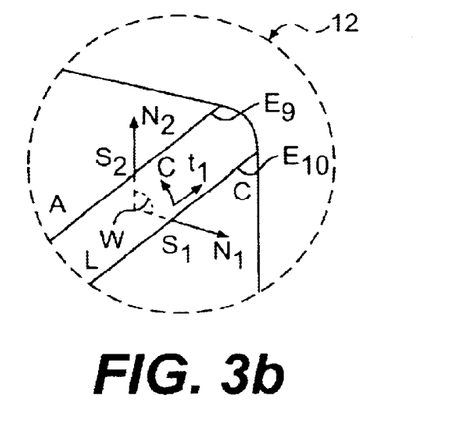
FIG. 3b is an enlarged view of the section of the part in FIG. 2 bounded by circle 12, labeled to show angle analysis.

L: Face tested for blend $E_9$: A smooth edge to be tested as spring edge for this face L A: Face adjoining A along edge E9

S: Mid-point of edge E9

T: Tangent of edge E at point S $I_1$ & $a_1$: The principal curvatures of faces L and A at point S in the direction nearest to T. (also referred to as along curvatures of the edge with respect to the face.)

$I_2$ & $a_2$: The other principal curvatures of faces L and A at S. (also referred as the cross curvatures of the edge with respect to the face.)

Assuming that face L in FIG. 3a is a blend face, cross curvature $I_2$ would correspond to the blend curvature and along curvature $I_1$ would be the other curvature.

Spring Test 1

Figure 4:
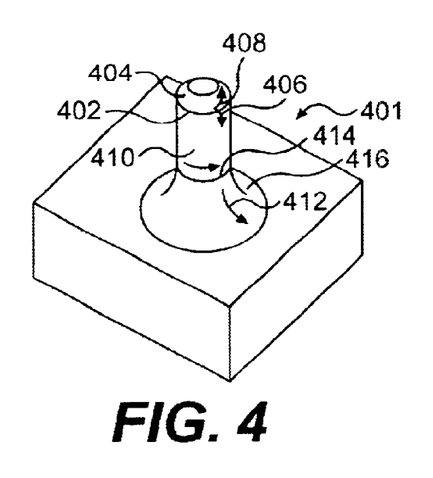
FIG. 4 is an isometric view of a solid model of a second part labeled to illustrate particular types of blends.

The first spring test simply asks two questions: (1) are curvatures $I_1$ and $I_2$ of the same sign (both convex or both concave)? and (2) if so, is the cross curvature $I_2$ greater than along curvature $I_1$? If both of these questions are answered "yes," then the edge ($E_9$) is a potential spring edge for the face L and $I_2$ is labeled as the blend curvature of the face L. As an example, FIG. 4 shows a part 401 with an edge 402 that is a potential spring edge for the blend face 404 based on this test. That is, both the across curvature 406 and the along curvature 408 are convex in sign and across curvature 406 is greater than along curvature 408

Spring Test 2

In spring test 2, if the two curvatures, $I_1$ and $I_2$, are of different sign (i.e., one convex and one concave), then $I_2$ could be less than $I_1$ and still correspond to the blend curvature. In such cases, an additional check is applied to determine if $I_2$ corresponds to the curvature along the curved direction of the face. The curved direction of the face is found using the following heuristic. The principal curvatures are first sampled at various points on the face. If a common principal curvature exists for the whole face, then the direction of that curvature is termed as the curved direction of the face. Else the individual sampled principal curvatures on each of the faces are averaged, and the higher averaged curvature is associated with the curved direction.

Turning again to FIG. 4, the common curvature for the torus 410 is the blend curvature 412, and edge 414 is a potential spring edge for blend face 416 based on this test. That is, across curvature 412 is a common principal curvature for the whole face 416.

Spring Test 3

The results of the above two tests are used to determine if the edge is a spring edge for a particular adjoining face. If the edge is not a potential spring edge for any of the faces that it adjoins, then it cannot be a spring edge. If the edge is a potential spring edge for exactly one of the adjoining faces, then it is a spring edge with that adjoining face as the blend face. If the edge is a potential spring edge for both the adjoining faces, then the following test is used to determine the face for which the edge is a spring edge.

Figure 5:
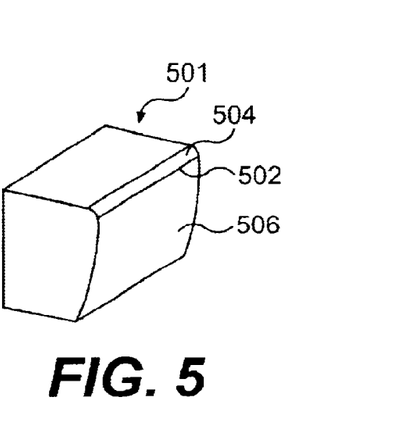
FIG. 5 is an isometric view of a solid model of a third part labeled to illustrate other types of blends.

If the blend curvatures of the two adjoining faces (found using the face tests above) are of the same sign, then the blend face is the face with a higher blend curvature. This analysis is illustrated in FIG. 5 where edge 502 lies between faces 504 and 506 of part 501 and, under Spring test 1, edge 502 is a potential spring edge for either face 504 or face 506. Under Spring test 3, since the blend curvatures of faces 504 and 506 are of the same sign (both concave), and since face 504 has higher blend curvature, face 504 it is labeled as the candidate blend face for spring edge 502.

If the blend curvatures of the two faces are of different signs, the edge is labeled as a spring edge and the face with higher blend curvature is chosen as the blend face. Additionally, in this situation, the spring edge is marked as ambiguous. The ambiguous attribute indicates that either of the faces adjacent to the spring edge could be a blend face on the other. An example of this is shown in FIG. 2 where faces H and M share potential spring edge $E_{12}$ and are of different signs. In this case, face M is chosen as the blend face since it has greater across curvature than face H and spring edge $E_{12}$ between the two faces is marked as ambiguous. This attribute on the spring edge is used during chaining.

Cross Edge Detection

The next step in the second level method is the detection of cross edges in the model. A cross edge is generally described as the edge between two blend faces. To be labeled as a cross edge, an edge must pass all of the following checks.

Smooth Check: The across curves must be smooth and must not be a spring edge.

Circular Check: The curve of the cross edge is tested for circularity for rolling ball circular blends. The circularity can be tested by picking three points on the cross edge and then checking if the sample points lie on a circle, within a tolerance.

Parametric Test: The edge must be along the blend direction of the face. The blend direction is computed using a spring edge of the face. Any face has two parameter directions (U and V) of the surface. The direction across the spring edge is termed the blend direction U and the direction along the spring edge is termed the V direction.

In FIG. 2, edge $E_6$ passes each of these tests. The across curves are smooth between face D and Face J, it has a circular blend curvature, and it is along the blend direction of both faces D and J. Therefore edge $E_6$ is a cross edge for both faces D and J.

Validating Blends

If the face has no spring edges, then the face is not a blend face and no more consideration is necessary. If the face does have at least one spring edge, it is a potential blend face and further geometric checks are applied to verify if it is a blend face. These tests are briefly described below.

If the detected blend face was created by blending an edge, then the angles between the two support faces must be below some maximum possible angle. In most systems, this angle is 180°, however, many applications may need the maximum angle to be less than 180°. The method uses a user-defined maximum angle and checks whether the angle between the two supports is less than the user-defined maximum angle.

Figure 7:
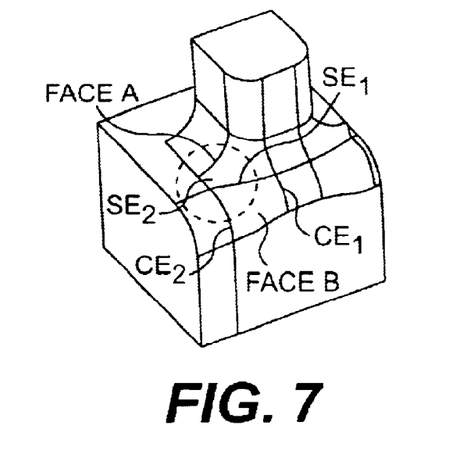
FIG. 7 is an isometric view of a solid model of a fourth part labeled to illustrate post processing of ambiguous spring edges.

The validation process is described with notations on the enlarged portion of the part in FIG. 2 inside circle 12 that is again shown in FIG. 7. The blend angle is computed by picking a point $s_1$ on one spring edge ($E_{10}$) of the potential blend face (L) and finding another point $s_2$ on the opposite spring edge $E_9$ which is the closest point to $s_1$. The angle of the blend between $s_1$ and $s_2$ is obtained using the tangent $t_1$ to the spring edge and the curvature sign $c_1$ of the blend surface as follows. Let $N_1$ and $N_2$ be the normals to the blend evaluated at the two points, $s_1$ and $s_2$, respectively. Let $t_1$ be the tangent to the first spring edge at $s_1$ and $c_1$ be the sign of the blend curvature at $s_1$. The absolute angle W is first calculated as the smallest angle between $N_5$ and $N_6$ If the sign of the triple product of $N_1$, $N_2$ and $t_1$ is same as that of $c_1$, the blend angle is calculated as complement of 2*pi−W. Else the blend angle is equal to W.

Parameterization

In this process, a parameterization is created for the blend face. The parameterization is essentially a group of attributes associated with and describing the blend face. As such, it initially contains the blend features (spring edges and any cross edges) of the blend face. The edges are classified first into two lists based on the direction of the spring edges along the face. One of the spring edges of the face is chosen as the reference spring edge and the edges on the face are then reviewed in a counter-clockwise direction with respect to the face normal. The spring edges reviewed along the same direction as the reference spring edge is collected in the first list, while the spring edges reviewed in the opposite direction to the reference spring edge are collected in a second list.

For an example of the orienting and grouping the spring and cross edges for a blend face, we turn again to FIG. 2. With respect to blend face H, the first list would begin with spring edge $E_{11}$. The second list would consist of spring edge $E_{12}$.

If each of the spring edge lists contains at least one spring edge, then the blend face is parameterized as a normal face-face blend. If one of the lists is empty, the blend face is parameterized as a face-edge blend (or a cliff blend), as would be the case with face D in FIG. 2.

In addition, the parameterization also contains the geometry of the blend face. There are two classes of blend faces considered by the method of the invention, namely, constant radius rolling ball blends and variable radius blends. (Vertex blends are detected separately in the recognition method.) Blends with the same radius throughout the surface are called constant radius rolling ball blends while variable radius blends have varying cross sectional radii along the blend geometry. Most of the blend faces shown in FIG. 2 are constant radius rolling ball blends, but blend face N is a variable radius blend.

Constant radius blend surfaces are found by testing if the principal curvature along the blend direction is constant. In such cases, the reciprocal of the constant principal curvature is stored as the radius value of the blend face. If the principal curvatures are different, the parameterization stores a variable radius blend geometry for the face which is determined by sampling the cross sectional radii at various points along the spring edges.

Post-processing Spring Edges

As noted above, during the method of Spring test 3, some spring edges may be labeled as ambiguous. In this post processing method, the spring edges that are labeled as ambiguous are corrected using the information from neighboring cross curves.

An ambiguous spring edge lies between a first face and a second face. If one of the faces is not a blend face, then the spring edge is definitely associated with the face that is a blend face and the ambiguous attribute can be corrected. However, if both the first and second faces are blend faces, then the following check is applied. If one face has a spring edge adjacent to the ambiguous spring edge, and the other face has a cross edge that is adjacent to the ambiguous spring edge, then the ambiguous spring edge is associated with the other face. In FIG. 7, $SE_1$ is an ambiguous spring. and $SE_2$ is a spring edge of blend face A, while $CE_2$ is a cross edge of blend face B. So the ambiguous spring is associated with face B.

Vertex Blend Recognition

Figure 6:
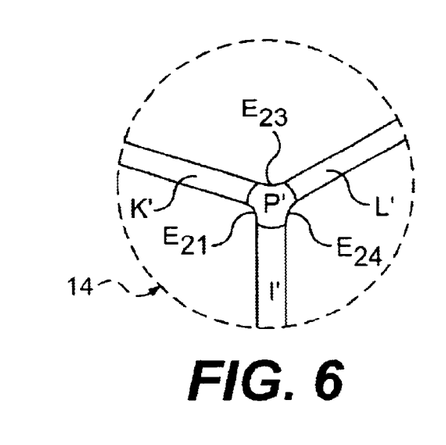
FIG. 6 is an enlarged view of the section of the part in FIG. 2 bounded by circle 14, illustrating an alternative type of vertex blend.

Vertex blends are detected in a latter portion of the method. Vertex blends are of two types, namely, simple and n-sided. The simple vertex blends are the commonly occurring vertex blends with 3 cross edges. n-sided vertex blends have more than 3 cross edges and are generated by advanced blending operations. Blend P in FIG. 2 is a simple vertex blend and an n-sided vertex blend is shown in FIG. 6, as blend P' at the intersections of blends K', L' and I'. The n-sided vertex blend P' has additional edges $E_{21}$, $E_{23}$ and $E_{24}$.

The following tests are applied to detect and categorize the vertex blends. A simple vertex blend is characterized as a face that does not get detected as a blend during the first part of the method (because it has no spring edges) and it has at least 2 cross edges along the face. If the face passes the test for a normal blend in the first part of the method and it has more than 2 cross edges, then the face is an n-sided vertex blend.

Blend Chaining

After the blend faces are recognized and parameterized, a further process is run to group the blend faces into blend chains. Each blend chain includes the blends that were created by the same blending operation. This method also sequences the blend chains in the order in which they were created in the original model. This method comprises three processes: adding feature relations to each blend feature; forming chains of blend faces based on these feature relations; and sequencing these chains based also on feature relations.

Adding Feature Relations

Figure 9:
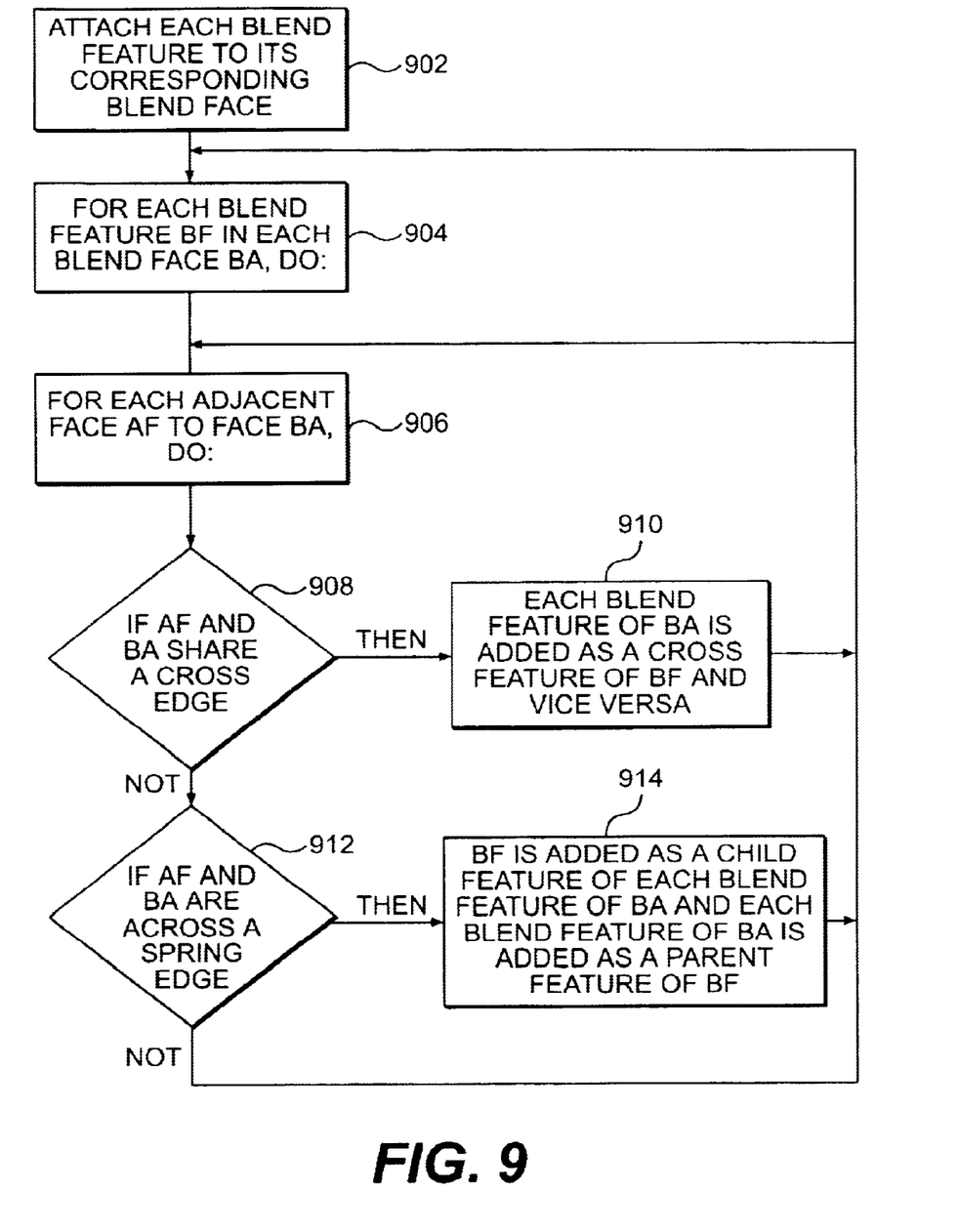
FIG. 9 is a flowchart illustrating one embodiment of the process for adding feature relations to blend features.

The process for adding feature relations is shown in the flowchart of FIG. 9. Essentially, this part of the method seeks to identify neighboring blend features (spring edges or cross edges) whose faces share another blend feature in common. The first step in the method is to attach each blend feature (spring edges, cross edges) as a parameterization attribute to its corresponding blend face (step 902). This enables efficient finding of the corresponding blend feature from a defined face. Then, for each blend feature connected to another blend feature via a cross edge (i.e., their associated faces share a cross edge), the neighboring blend features are each added as a cross feature of the other blend feature. If the associated faces are separated by a spring edge, then there is a parent/child relationship between the neighboring blend features.

Again, this process is shown in FIG. 9, where each blend feature BF of each blend face BA is chosen in step 904 and is analyzed in steps 906 through 914. In step 906, the relationship between each adjacent face AF and blend face BA is determined and, if the faces share a cross edge (908), then any blend feature on adjacent face AF is added as a cross feature to BF and BF is added as a cross feature to each blend feature on blend face AF (910). A spring edge separating two blend faces gives a parent/child relationship. Thus, if blend faces AF and BA are across a spring edge (912), then BF is added as a child feature of each blend feature of AF and each blend feature of AF is added as a parent feature of BF (914).

As an example, in FIG. 2, blend face H has cross edge $E_7$ and spring edge $E_{11}$. Edge $E_7$ is a cross edge that separates face H from face J and edge $E_{11}$ is a spring edge that separates blend face H from face C. Blend face J also has a blend feature that it shares with adjoining blend face I (spring edge $E_{14}$), and blend face I also has spring edges $E_3$ and $E_8$. According to this method, the blend feature on blend face H is added as a cross feature to the blend feature on blend face J. Similarly, the blend feature of blend face J is added as a cross feature of the blend feature on blend face H. The blend feature on blend face J is added as a child feature of the blend feature on blend face I, while the blend feature on blend face I is added as a parent feature of the blend feature on blend face J.

Chain Formation

Figure 10:
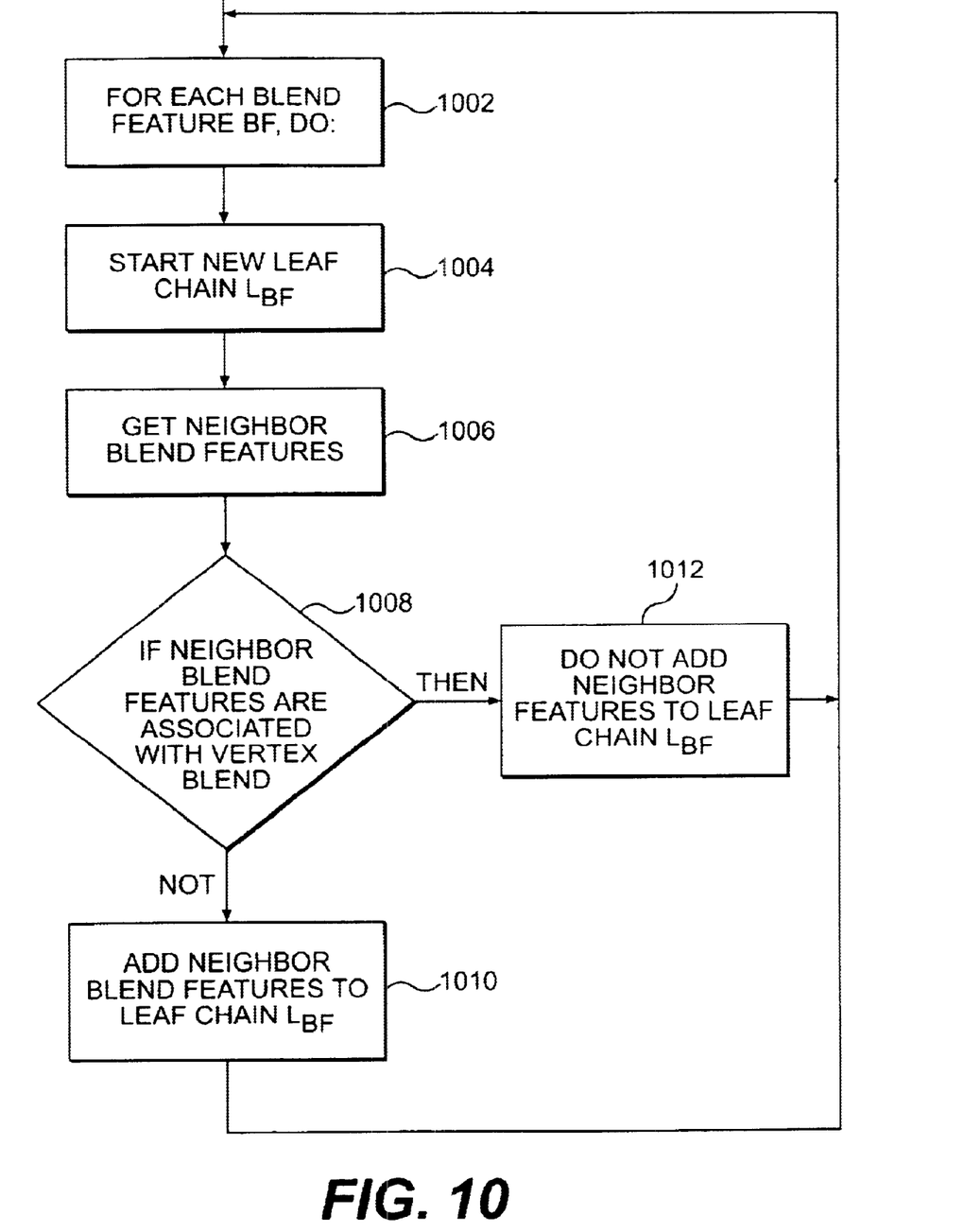
FIG. 10 is a flowchart illustrating one embodiment of the process for creating leaf chains of blend faces.

Once all the blend faces are determined, in a preferred embodiment of the invention, they are then grouped into blend chains. This takes place using the cross features found in the process above. First, the blend faces are formed into minimal groups of blend faces that were likely created in one blending operation. These groups are called leaf chains. This process is illustrated in the flowchart of FIG. 10 where a loop is run for each blend feature BF, beginning with step 1002. A new leaf chain L is started in step 1004 and the neighbor blend features to feature BF are obtained in step 1006. These are the neighbor blend features added as cross features above in the method shown in FIG. 9. If the neighbor blend features are not associated with a vertex blend, then they are added to the leaf chain L (steps 1008 and 1010).

In the next process, leaf chains that are connected across vertex blends are combined into a single blend chain. This is also done using the attributes determined above. In general, a chain consists of a number of leaf chains, where each leaf chain consists of many blend features. Each blend feature has a pointer to its owning leaf chain and each leaf chain has a pointer to its owner chain.

Further, each chain also contains information about its parent and child chains. These are determined using the blend features within the chain and the parent and child features between the features, as determined in the process shown in FIG. 9. The parent/child relationship with respect to chains indicates the sequence of formation, which is determined as described below.

Chain Sequencing

Figure 11:
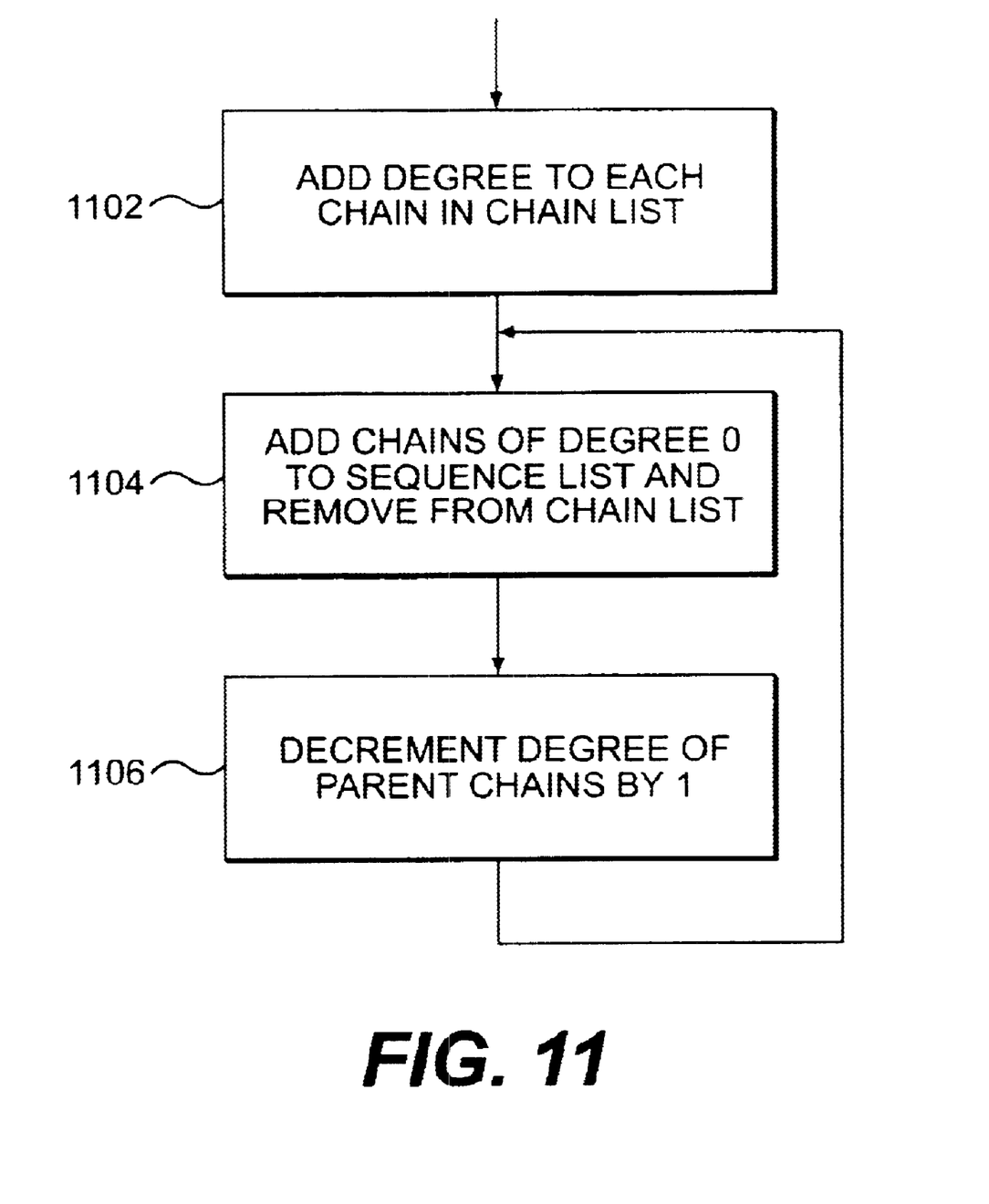
FIG. 11 is a flowchart illustrating one embodiment of the process for creating sequence chains of blend faces.

The purpose of the sequencing process is to list the chains in the order in which they were created in the model. This process is outlined in the flowchart of FIG. 11. To begin, an attribute is attached to each parent chain that stores the degree of the chain (step 1102). The degree is defined as the number of child chains of the parent chain. The process then comprises a loop wherein chains of degree 0 are repeatedly removed and added to an output list of sequential chains (step 1104) and the degree of each of the parent chains of the removed chains is decremented by 1 (step 1106).

In some cases, the process may not find any chain in the list that has a degree of zero. Such a condition is termed a cyclic case. If such a condition is encountered, all the remaining blend features are added in the end of the list and a procedure is called to break the cycle. This is done by splitting the leaf chains involved in the cycle into independent chains as follows. For each chain in the list, the child chains are checked as to whether they appear before the chain in the sequenced list. If they appear after this chain in the list, then the leaf chains of this chain are broken into separate chains. After this operation, the chains are again sequenced using the method described above.

In a preferred embodiment, once the blends, chains and sequence of chains have been determined, the data concerning the position, configuration (including radius of curvature) and sequence of the blends can be submitted to the geometric kernal and added to the B-rep model of the part to, in essence, remove the blends from the model. As noted above, this final aspect of the invention is important for design and manufacturing considerations, including tool selection and simplification of the part for downstream applications.

Although the present invention has been described above to specify exemplary embodiments thereof, it will be understood by those skilled in the art that variations and modifications can be effected in these exemplary embodiments without departing from the scope and spirit of the invention.

We claim:

1. A method for building a database of at least one blend face in a solid model of a part, said method comprising:
   a. generating a list of faces comprising the solid model, each of said faces being defined by edges;
   b. analyzing at least one of said edges to determine that it is a smooth edge;
   c. analyzing said determined smooth edge to determine that it is a spring edge;
   d. analyzing said determined spring edge to identify a blend face that is adjacent to said spring edge.

2. The method as in claim 1, wherein all of said edges defining all of said faces are analyzed to determine all of said smooth edges, all of said smooth edges are analyzed to determine all of said spring edges and all of said spring edges are analyzed to determine all of said blend faces that are adjacent to each said spring edge.

3. The method as in claim 2, further comprising analyzing all of said smooth edges to determine at least one cross edge.

4. The method as in claim 3, further comprising analyzing all of said smooth edges to determine all of said cross edges in said solid model.

5. The method as in claim 4, further comprising validating said blend faces and adding each blend face to a blend face list.

6. The method as in claim 5, further comprising further analyzing each of said spring edges to determine additional blend faces and adding each said additional blend face to said blend face list.

7. The method as in claim 6, further comprising, analyzing each of said spring edges and said cross edges to detect vertex blend faces.

8. The method as in claim 6, further comprising creating a parameterization for each blend face in said blend face list comprising each spring edge and cross edge associated with said blend face and information regarding the geometry of said blend face.

9. The method as in claim 1, wherein, in analyzing at least one of said edges to determine that it is a smooth edge, a vector is positioned at the midpoint of said edge normal to the surface of each face adjacent to said edge and the magnitude of the cross product of said vectors is less than a predefined threshold.

10. The method as in claim 1, wherein, in analyzing said determined smooth edge to determine that it is a spring edge, said smooth edge is first checked to determine if it is a potential spring edge for each face adjoining said smooth edge.

11. The method as in claim 10, wherein each said face adjoining said smooth edge has an along curvature $I_2$ with respect to said face representing the curvature of said face along the length of said smooth edge and a cross curvature $I_1$ with respect to said face representing the curvature of said face in a direction perpendicular to said smooth edge, said method further comprising testing each face adjoining said smooth edge and if both (i) $I_1$ and $I_2$ are of the same sign and (ii) $I_2$ is greater than $I_1$, storing $I_2$ as the blend curvature of the face.

12. The method as in claim 11 wherein, if (i) is true but (ii) is not true, determining if $I_2$ corresponds to the principal curvature of the face.

13. A method for building a database of at least one chain of blend faces in a solid model of a part, said method comprising:
   a. for each blend feature BF in said solid model, adding all cross features of BF and all parent and child features of BF;
   b. for each blend feature BF, begin chain C and add all neighbor blend features of BF across cross edges to chain C.

* * * * *